(12) United States Patent
Bertolini et al.

(10) Patent No.: US 6,447,285 B1
(45) Date of Patent: Sep. 10, 2002

(54) PROCESS FOR CATALYTIC CHEMICAL REACTION AND CATALYST

(75) Inventors: Jean-Claude Bertolini; Jean Massardier, both of Villeurbanne; Christophe Methivier, Vincennes, all of (FR); Estelle Chaize, Cambridge (GB)

(73) Assignee: Centre National de la Recherche Scientifique, Paris (FR)

(*) Notice: Subject to any disclaimer, the term of this patent is extended or adjusted under 35 U.S.C. 154(b) by 0 days.

(21) Appl. No.: 09/529,504

(22) PCT Filed: Oct. 9, 1998

(86) PCT No.: PCT/FR98/02175
§ 371 (c)(1),
(2), (4) Date: Apr. 18, 2000

(87) PCT Pub. No.: WO99/20390
PCT Pub. Date: Apr. 29, 1999

(30) Foreign Application Priority Data

Oct. 16, 1997 (FR) ............................................ 97 13194

(51) Int. Cl.⁷ ................................................. B01J 27/24
(52) U.S. Cl. ............................................. 431/7; 502/326
(58) Field of Search ................................ 502/520, 439, 502/326; 423/245.3; 431/2, 7, 268

(56) References Cited

U.S. PATENT DOCUMENTS

| | | | | |
|---|---|---|---|---|
| 4,166,808 A | * | 9/1979 | Daumas et al. | ............. 502/520 |
| 4,940,684 A | * | 7/1990 | Okutani et al. | ............. 502/439 |
| 5,004,709 A | | 4/1991 | Stranford et al. | |
| 5,307,772 A | * | 5/1994 | Rao et al. | ................... 123/272 |

FOREIGN PATENT DOCUMENTS

| EP | A1 0 712 820 | 5/1996 |
|---|---|---|
| EP | A1 0757 024 | 5/1997 |

OTHER PUBLICATIONS

Babor, *J. Basic College Chemistry*, $2^{nd}$ Ed., N.Y., Thomas Y. Crowell Company, 1953, p. 256.*

Y. Soma–Noto et al., "Infrared Spectra Carbon Monoxide Absorbed on Supported Palladium and Palladium–Silver Alloys," *Journal of Catalysis*, 32, 315–324, 1974.

N. Kundo et al., "Catalyst for oxidn. of methane with air oxygen—consists of nickelous oxide active component on beta," *STN International*, Wpindix File Search Results, Sep. 1996 (Abstract).

Dwyer, "Catalysis for Control of Automotive Emissions", Marcel Dekker, Inc., 1972.

"Physical Constants of Organic Compounds," *CRC Handbook of Chemistry and Physics*, $70^{th}$ Edition, 1989–1990, CRC Press, Inc.

Boudart et al., "La Cinétique Des Réactions En Catalyse Hétérogéne," Masson, 1982.

L. Lozzi et al., "Surface Stoichiometry Determination of $SiO_xN_y$ Thin Films by Means of XPS,", *Surface and Interface Analysis*, vol. 22, 190–192, 1994.

K. Le Bas, "Preparation de Catalyseurs Pd–Cu/$SiO_2$ a Partir D'Acetylacetonates, Reactivite vis A vis De L'Hydrogenation Du Butadiene–1–3, ET DE La Reduction de No Par Co," Doctoral Thesis, Devant, Devant l'Universite, Claude Bernard—Lyon–I, Sep. 1994.

Brunauer et al., "Adsorption of Gases in Multimolecular Layers," *Contribution from the Bureau of Chemistry And Soils and George Washington University*, vol. 60, pp. 309–320, Feb. 1938.

Taylor et al., "Chemical Reactions of $N_{2^+}$ Ion Beams with Group IV Elements and Their Oxides," *Journal of Electron Spectroscopy and Related Phenomena*, 13, pp. 435–444, 1978.

* cited by examiner

Primary Examiner—Sara Clarke
(74) Attorney, Agent, or Firm—Oliff & Berridge, PLC

(57) ABSTRACT

A process for a catalytic chemical reaction includes depositing a solid catalyst on a refractory catalytic support. A catalyst includes an active metal phase and a refractory catalytic support of mainly silicon nitride in α-form.

12 Claims, 5 Drawing Sheets

PROCESS FOR CATALYTIC CHEMICAL REACTION AND CATALYST

BACKGROUND OF THE INVENTION

The present invention relates to a process for a high-temperature catalytic chemical reaction which uses a solid catalyst comprising an active metal phase and a non-oxidized refractory catalytic support on which the active phase is deposited.

More particularly, the catalytic support is based on silicon nitride ($Si_3N_4$).

Silicon nitride exists in two crystalline forms, the α form (α-$Si_3N_4$), known as the low temperature form (<1200° C.), and the β form (β-$Si_3N_4$), known as the high temperature form (>1500° C.). The two forms coexist between 1200° C. and 1500° C. The structures of each of these forms are essentially distinguished by a different arrangement of the $SiN_4$ tetrahedra.

V.I. Simagina et al. [1] have described the use, for the oxidation reaction of methane, of a catalyst comprising, as catalytic support, porous β-$Si_3N_4$ on which nickel oxide is dispersed. In order to obtain a satisfactory conversion yield, the reaction temperature has to reach 850° C. This is because the stability of the methane molecule requires high temperatures for initiating the reaction. However, the use of high temperatures results in the undesirable production of contaminants, such as carbon monoxide, resulting from the decomposition of carbon dioxide and/or from the partial oxidation of methane, and nitrogen oxides, originating from the oxidation of atmospheric nitrogen.

SUMMARY OF THE INVENTION

The authors of the present invention have looked for a catalyst which is sufficiently active to catalyze reactions of the abovementioned type but which makes it possible to lower the temperature thereof in order to eliminate the abovementioned disadvantages while having high stability and high reactivity under particularly severe conditions, namely oxidizing atmosphere and high exothermicity.

Thus, they have discovered, for catalytic chemical reactions which normally take place at high temperature, that a solid catalyst comprising an active metal phase and a refractory catalytic support comprising mainly silicon nitride in its α form makes it possible to lower the reaction temperature to and to control it at a value of between 200° C. and 800° C. and preferably between 200° C. and 600° C.

The silicon nitride is advantageously in the substantially non-porous state.

Before describing the present invention in more detail, certain terms employed are defined hereinbelow.

"Reaction which normally takes place at high temperature" comprises reactions which only take place under or the yield of which is improved only under high temperature conditions (so-called "operating temperature") and also highly exothermic reactions, the operating temperature of which is not necessarily very high but which release thermal energy which raises the local operating temperature with the possible creation of hot spots.

"Substantially non-porous" is understood to mean a material which does not exhibit a hysteresis cycle in nitrogen adsorption/desorption isotherms at the temperature of liquid nitrogen.

According to the invention, the support comprises mainly silicon nitride in its α form; this means that it is composed of 90% at least of said form, it being possible for the remainder to be in particular the β form of silicon nitride.

DETAILED DESCRIPTION OF THE PREFERRED EMBODIMENTS

The preferred alternative forms of the process of the invention are presented hereinbelow:

the support is advantageously in the discrete form with a particle size of between 0.1 and 1 μm;

the active metal phase, that is to say the catalytic phase, is chosen in particular from transition metals and preferably consists of palladium;

the process of the invention is particularly suitable for the catalysis of chemical reactions which take place in an oxidizing atmosphere, such as oxidations; thus, the combustion reaction of methane, in an oxidizing atmosphere, which is illustrated in the examples which will follow, is advantageously carried out according to the process described hereinabove, the support exhibits a specific surface preferably of between 5 and 20 $m^2/g$, the ratio of the proportion by weight of the metal of the active metal phase and in particular of palladium to that of the silicon of the support is advantageously between 0.5 and 2% by weight, the catalyst is preferably obtained by impregnating the support with metal acetylacetonate salts and then activating according to a protocol which will be described later.

Another subject-matter of the invention is a catalyst comprising an active metal phase and a refractory catalytic support comprising mainly silicon nitride in its α form. Preferably, the support is substantially non-porous.

BRIEF DESCRIPTION OF THE DRAWINGS

The details and advantages of the present invention are now illustrated in the following Examples 1 to 4, in combination with FIGS. 1 to 8.

FIG. 3A corresponds to the Si2p level of the $Si_3N_4$ and FIG. 3B corresponds to the N1s level of the $Si_3N_4$.

EXAMPLE 1

EXPERIMENTAL TECHNIQUES

Figure 1:
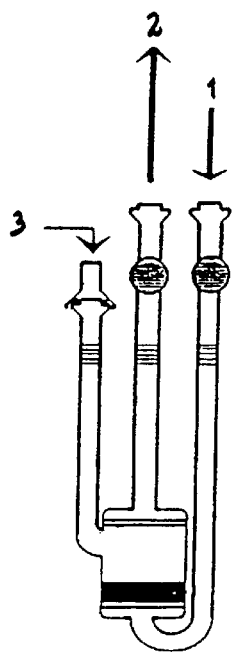
FIG. 1 represents a decomposition cell in which the support, impregnated with the precursors of the active metal phase, is subjected to an activation heat treatment.

1) Measurement of the Specific Surface of the Supports by the BET Method

Brunauer, Emmet and Teller [2] developed a method which makes it possible to determine the specific surface of a solid by physical adsorption. The adsorption is governed by the law:

$$\frac{P}{V(P_0 - P)} = \frac{1}{CV_m} + \frac{P(C-1)}{CP_0V_m}$$

with

V: Volume adsorbed at the pressure P, $V_m$: Volume of gas corresponding to the monolayer, C: Constant (function of the heat of adsorption), $P_0$: Saturated vapor pressure of the gas under the conditions of the adsorption.

By plotting $P/P_0$ as a function of $P/V(P_0-P)$, a straight line is observed (for $P/P_0$ of between 0.05 and 0.35), the slope of which is $1/V_m$ when C is large compared with 1 (case of nitrogen). In order to calculate the surface corresponding to the monolayer, it is accepted that the surface occupied by the adsorbed molecule is that of the molecule in the liquid state, i.e. 0.162 $nm^2$ for nitrogen at 77K. The relationship which gives the BET surface is then, using nitrogen as adsorbate, $S_{BET}(m^2/g)=4.35V_m (cm^3/g)$.

The BET measurement was used to measure the specific surface of the silicon nitrides, employing nitrogen as adsorbate at 77K, using a volumetric technique employing an automatic and computerized device developed at the Institut de Recherche sur 1a Catalyse [Institute for Research on Catalysis] (Villeurbanne, France). Before each measurement, the samples are treated under high vacuum (approximately $10^{-5}$ Torr) at 300° C. in order to degas them.

2) Structural Analysis 2.1) X-ray Diffraction

X-ray diffraction makes it possible, firstly, to identify the crystalline phases.

Powder diffractograms are run on a Philips PW 1050/81 goniometer controlled by a microcomputer. Use is made of a Siemens K710 generator with a copper tube and a flat graphite monochromater situated on the beam. The latter makes it possible to select the wavelength $\lambda CuK\alpha = 0.154184$ nm. The data are subsequently processed by means of a software program in combination with the ICCD-JCPDS database.

The broadening of the diffraction lines makes it possible to measure the mean size $\Phi$ of the crystallites from the Scherrer formula:

$$\Phi = \frac{k\lambda}{B\cos\theta}$$

with k: Scherrer constant $\lambda$: wavelength $\theta$: Bragg angle

B: integral width of the peak in radians.

2.2) High-resolution Transmission Electron Microscopy

The equipment used is a microscope of Jeol 2010 type with a point resolution of 0.19 nm. The powders to be analyzed are suspended in ethanol and dispersed with ultrasound. A drop of this suspension is deposited on a slide grid composed of a copper screen covered with a thin carbon film (<10 nm).

The high resolution observation consists in creating interferences between the electrons transmitted and detracted by the sample. These interferences result in the appearance on the negatives of parallel fringes corresponding to the families of grating planes in the diffraction position (planes virtually parallel to the beam in the case of electron diffraction).

In practice, a diaphragm makes it possible to select the waves which will be used for the formation of the high resolution image. In general, it is sufficient to take the transmitted wave and two diffracted waves.

By measuring, on the negatives, the distances between fringes and the angles between families of fringes, it is possible to identify very locally the crystalline phases.

This technique will make it possible, in some cases, to determine the nature of the interaction between the support and the active phase and the location of the phases detected by X-ray diffraction.

3) Determination of the Dispersion

The dispersion of a metal catalyst is the ratio of the number of metal atoms at the surface to the total number of metal atoms present on the catalyst. It therefore makes it possible to relate the activity of the catalyst to that of the surface atoms thus accessible to the gas.

3.1) Hydrogen Thermal Desorption

Based on the use of mass spectrometry, this technique makes it possible to determine the hydrogen amount chemisorbed per unit of catalyst mass. It makes it possible to measure the dispersion with reference to a catalyst of known dispersion.

After reduction at 400° C., the solids are carefully degassed at this temperature and then brought to the adsorption temperature of the hydrogen, which is 25° C. After hydrogen adsorption to saturation, the solids are evacuated at room temperature, until a vacuum of the order of $10^{-8}$ Torr is obtained, in order to remove the simply physisorbed phase and the palladium hydride phase. The catalyst is subsequently heated by linear temperature programming (40° $C.min^{-1}$) and the thermally desorbed hydrogen, which corresponds to the chemisorbed hydrogen, is continuously analyzed by mass spectrometry. The integration of the thermal desorption peaks (m/e=2) makes it possible to calculate the amount of adsorbed hydrogen from calibrations made on a standard catalyst ($Pd(0.41\%)/SiO_2$, dispersion= 0.75) and by assuming an adsorption stoichiometry $H_{ads}/P_{ds}=1$.

The hydrogen thermal desorption results are expressed by the ratio $N_H/N_{pd}$, which corresponds to the ratio of the number of hydrogen atoms which is desorbed from the catalyst to the total number of palladium atoms which are present on the catalyst.

3.2) Conventional Transmission Electron Microscopy

The equipment used is the same as that of the high resolution described in 2.2).

Electron microscopy has allowed us to statistically determine the size of the metal particles. The quantification of the population of the palladium particles was carried out by size category (size histogram). The surface-weighted diameters $d_s$ of the metal particles are deduced therefrom according to the relationship:

$$d_s = \frac{\sum n_i d_i^3}{\sum n_i d_i^2}$$

$n_i$ representing the number of particles with a diameter of $d_i$.

Calculation of the dispersion from $d_s$:

From $d_s$, it is possible to determine the metal surface [sic] which is expressed, on the assumption of spherical particles, by:

$$S\ (m^2/g) = \frac{6}{\mu d_s}$$

$\mu$ representing the density of palladium.

If it is assumed that the densest planes ((100), (110) and (111) planes of the cfc unit cell of the palladium) are exposed and by assuming [sic] a homogeneous distribution of these planes, it is possible to determine the number of surface metal atoms occupying a unit surface area. In the case of palladium, there are on average $1.29 \times 10^{19}$ atoms/m$^2$.

The dispersion is then given by:

$$\text{Dispersion} = \frac{S \times 1.29 \times 10^{19} \times M}{N_A}$$

with $M$ = molar mass of $Pd$ (106.4 g)

$$N_A = 6.02 \times 10^{23} \text{ atoms}$$

or alternatively $$\text{Dispersion} = \frac{6 \times 1.29 \times 10^{19} \times M}{\mu \times d_s \times N_A}$$

with, for palladium, $\mu = 12.02$ g/cm$^3$ i.e.

$$\text{Dispersion} = \frac{1.13}{d_s\ (nm)}$$

4) Characterization of the Surface of the Catalysts by X-ray Photoemission Spectroscopy (XPS)

X-ray photoemission spectroscopy or XPS makes it possible to directly access the binding energy of the core electron levels, this energy being specific to the atom under consideration.

Principle:

The sample to be analyzed is bombarded with a flux of X-ray photons with an energy of hv. The electrons torn off from the material are emitted with a kinetic energy kE which allows the binding energy bE of the element under consideration to be determined from the principle of conservation of energy:

$$h\nu = kE + bE + \Phi_{sp}$$

with $\Phi_{sp}$: work function of the spectrometer determined by calibration with regard to the $3d_{5/2}$ line of silver, which has a binding energy of 368.2 eV.

The modification of the chemical environment of an element is reflected by a modification in the binding energy of the core levels. This technique is therefore informative with regard to the oxidation number of the atoms at the surface of the material.

XPS also makes it possible to determine the relative concentrations of the various elements in the surface layers.

Equipment:

The experiments were carried out on an Escalab 200R device (Fisons Instrument).

The excitation source is magnesium K$\alpha_{1,2}$ radiation (1253.6 eV). Using a transfer case, the catalysts can be analyzed after reduction in a specific reactor without being exposed to the air.

5) Catalytic Test: Catalytic Combustion of Methane 5.1) Introduction

Of all the hydrocarbons, methane is the most difficult to oxidize [4]. This is because the bond energy of the C—H bond in methane has a value of 435 kJ/mol, whereas that of a C—C bond in the other hydrocarbons is lower and has a value of 300 to 350 kJ/mol [5]. This stability of the methane molecule is reflected by initiation temperatures for combustion which are greater for methane than for those of the other alkanes.

Conventional combustion carried out in the air in the presence of a flame is a process which is difficult to control which results, in addition to the formation of water and carbon dioxide, in contaminants such as carbon monoxide and nitrogen oxides. Furthermore, this reaction can only take place with a highly specific hydrocarbon/air ratio.

$$CH_4 + 2O_2 \rightarrow CO_2 + 2H_2O$$

$$DH°_{298} = -802 \text{ kJ/mol}$$

The use of a heterogeneous catalyst makes it possible to lower the reaction temperature, which has the consequence of limiting the formation of the undesirable gases: carbon monoxide and nitrogen oxides. This is because carbon monoxide results essentially from processes which take place at high temperature, such as the decomposition of carbon dioxide or the partial oxidation of methane. Likewise, the oxidation of atmospheric nitrogen by oxygen is a highly endothermic reaction which does not take place on the assumption of the catalytic reaction being carried out at a sufficiently low temperature.

5.2) Experimental Device

Figure 4:
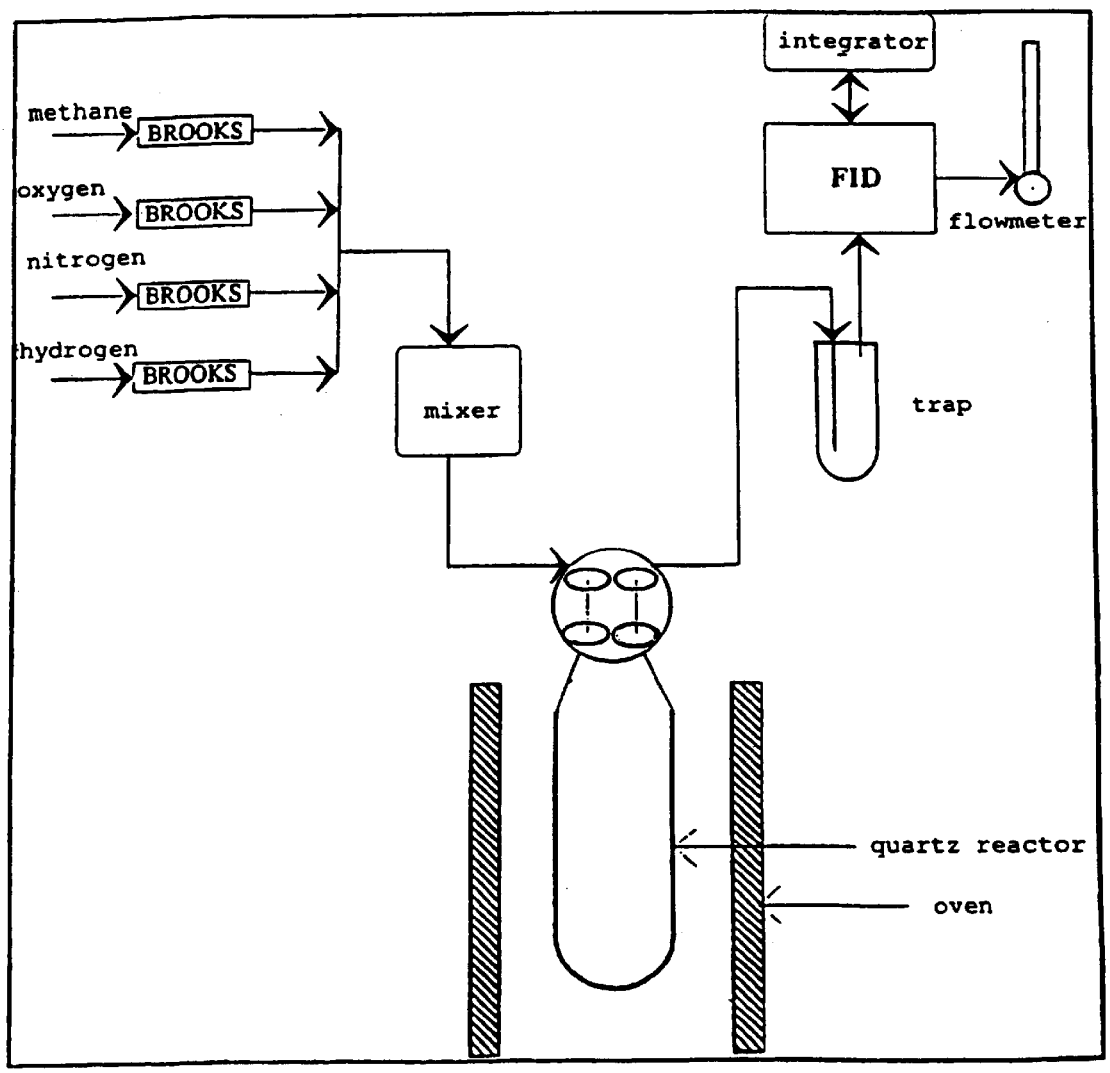
FIG. 4 is a diagram of the experimental device used to carry out the catalytic combustion of methane, during which combustion the catalyst of the invention is tested.

The reactions take place at atmospheric pressure in a stationary bed reactor through which passes, under continuous operating conditions, the gaseous reaction mixture. The catalytic activity is measured for small catalyst masses (300 mg) in the presence of a reaction medium composed of 1% methane, 4% oxygen and 95% nitrogen. The use of small catalyst masses and of a high dilution of the reactants in an inert gas makes it possible to minimize thermal runaway phenomena related to the high exothermicity of the combustion reaction of methane. The catalytic test is represented diagrammatically in FIG. 4.

According to this figure, the distribution point for the gases comprises: nitrogen, oxygen, methane and hydrogen. The hydrogen is used both as pretreatment gas for the catalysts and as carrier gas for the column of the chromatograph. The nitrogen, the oxygen and the methane constitute the reaction mixture.

The gas flow rates are controlled by "Brooks" mass flowmeters which operate at constant pressure. The pressure of the system is maintained by a manometer situated at the outlet of the chromatographs.

The reaction system is composed of the gas mixer, the 4-way valve, the stationary bed reactor, and the oven with programmer and temperature control. The U-shaped quartz stationary bed reactor with a diameter of 2 cm comprises a sintered glass on which the catalyst is deposited. The temperature measurements in the oven and in the catalytic bed are carried out by means of thermocouples. At the outlet of the reactor, a trap maintained at −78° C. with an acetone/dry ice mixture makes it possible to retain the water formed during the reaction, which can damage the column of the chromatograph.

The reaction mixture is injected at regular time intervals into the column of a flame ionization (FID) chromatograph. The injections are carried out automatically.

The FID chromatograph has a "Carbosieve S" column which makes good separation and resolution of methane possible. The carbon oxides, CO and $CO_2$, are detected by converting them beforehand into methane in a methanization oven by passing over an Ni/MgO catalyst. This operation, carried out after separation of the various gases in the column, makes it possible to obtain good sensitivity in the detection of the reaction products CO and $CO_2$.

The chromatogram is obtained on a recorder. The surface area of the peaks of the various products is determined by virtue of an integration program present in the SP4000 central processing unit. Quantitative analysis of the various products is carried out after calibrating with regard to a mixture of known composition.

5.3) Operating Conditions

The reactor is charged with a mass of 0.3 g of catalyst. Analysis of the gases at the beginning of the reaction is always carried out by short-circuiting the reactor. After stabilizing the mixture, the gases are conveyed over the preheated catalyst and the analysis of the products is carried out by automatic injection into the chromatograph at intervals of 15 to 30 min.

The catalytic test conditions are as follows:

Temperature range: 200° C.–800° C.

$CH_4$ partial pressure: 7.64 Torr, i.e. $10^{-2}$ atm $O_2$ partial pressure: 30.6 Torr, i.e. $4 \times 10^{-2}$ atm $N_2$ partial pressure: complement to 1 atm, i.e. 0.95 atm Total flow rate: 6.5 1/h Catalyst mass: 300 mg 5.4) Expression of the Results a) Overall Degree of Conversion or Transformation (ODC)

$P_0(CH_4)$ is the starting methane partial pressure and $P(CO_2)$ and $P(CO)$ are the partial pressures of $CO_2$ and of CO produced. The overall degree of conversion is expressed by:

$$ODC = \frac{P(CO_2) + P(CO)}{P_0(CH_4)} \times 100$$

ODC being expressed as % of methane converted.

However, this expression of the conversion does not take into account possible modifications in the fluctuation of the reaction mixture over time. In order to overcome this phenomenon, the starting $CH_4$ pressure will be calculated as a function of the $CH_4$, CO and $CO_2$ partial pressures in the reaction products with:

$P_0(CH_4)=P(CH_4)+P(CO_2)+P(CO)$

The overall degree of conversion is then written:

$$ODC \text{ (in \%)} = \frac{P(CO_2) + P(CO)}{P(CH_4) + P(CO_2) + P(CO)} \times 100$$

b) Expression of the Rate

The rate, expressed in moles of $CH_4$ converted per hour per gram of catalyst, is given by $v_1 = ODC \times P_0(CH_4)/760 \times F_T/22.4 \times 273/298 \times 1/m$ with: $P_0(CH_4)$: starting $CH_4$ pressure in Torr, $F_T$: total flow rate in 1/h, m: catalyst mass in grams.

This relationship is valid in the case of a stationary bed reactor operating under differential conditions; that is to say, at low conversion or in the presence of a small amount of catalyst.

The rate in moles of $CH_4$ converted per hour and per mole of metal is given by:

$$v_2 = ODC \times \frac{P_0(CH_4)}{760} \times \frac{F_T}{22.4} \times \frac{273}{298} \times \frac{M}{m} \times \frac{1}{W}$$

with

M: molar mass of palladium (106.4 g)

W: content by mass of palladium.

c) Activity per Surface Site

The activity per surface site or Turn Over Frequency (TOF) is defined as the number of methane molecules which has reacted per unit of time and per surface metal atom. The original definition [6] refers to the number of surface sites. However, the active site in the oxidation reaction of methane is not yet well known: this is why the choice has been made to calculate the TOF with respect to the number of surface metal atoms, $TOF(\text{in } h^{-1}) = v_2/D$ D representing the dispersion of the catalyst determined by microscopy or hydrogen thermal desorption.

EXAMPLE 2

CHARACTERIZATION OF THE SILICON NITRIDE TESTED

The silicon nitride used ($Si_3N_4$, Goodfellow) is in the non-porous pulverulent form and exhibits a specific surface, determined by the BET method described in Example 1, 1), of 8.8 m²/g.

Its X-ray diffraction spectrum (technique described in Example 1, 2.1)) demonstrates the presence of the α-$Si_3N_4$ phase, which exhibits a hexagonal structure with unit cell parameters a=b=0.7752 nm, c=0.562 nm. The other phase (β) of the silicon nitride is also observed but in a very small amount.

The surface characterization by XPS was carried out according to the technique described in Example 1, 4).

As the silicon nitride used is a poor electrical conductor, a shift by a few eV toward high energies was observed for all the lines of each spectrum. This overall charge effect is due to the poor conduction of the electrons in the sample analyzed. The charges then created during the photoemission process are not neutralized and there is accumulation of charges at the surface of the material.

The charge effect corrections are made by taking, as reference, the binding energy of the N1s level at 397.6 eV for $Si_3N_4$ (energy characteristic of nitrogen in $Si_3N_4$ [7]).

Figure 2A:
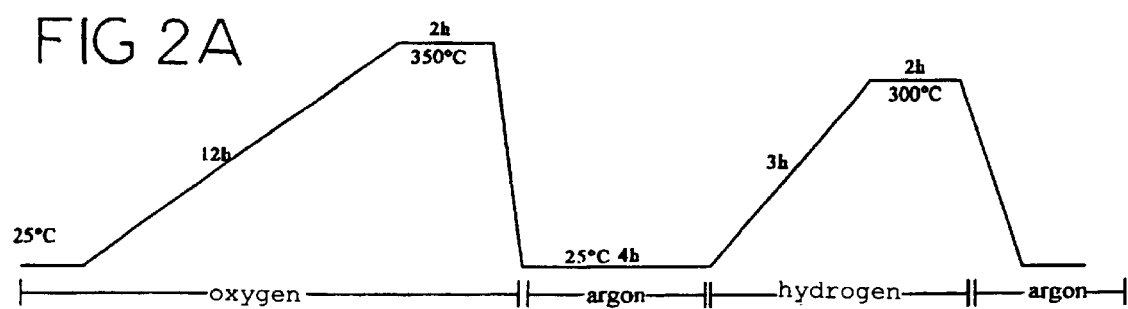
FIG. 2A corresponds to a calcination-reduction treatment and FIG. 2B corresponds to a decomposition under argon.
Figure 2B:
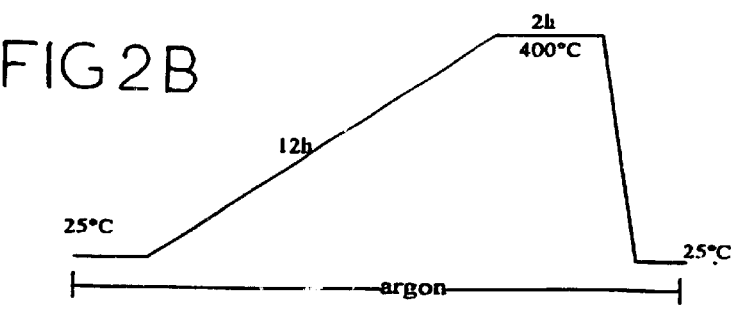
FIG. 2 represents the diagrams of the various temperature programs used for the stage of activation of the catalyst.
Figure 3A:
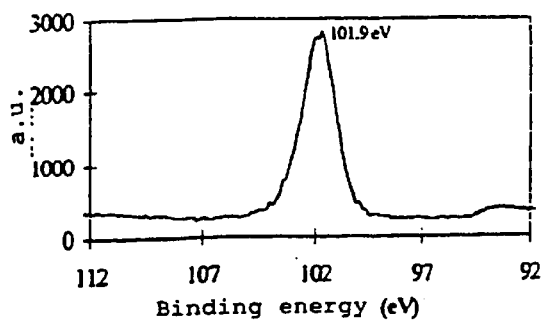
FIGS. 3A and 3B represent the spectra obtained by X-ray photoemission spectroscopy of the silicon nitride tested.
Figure 3B:
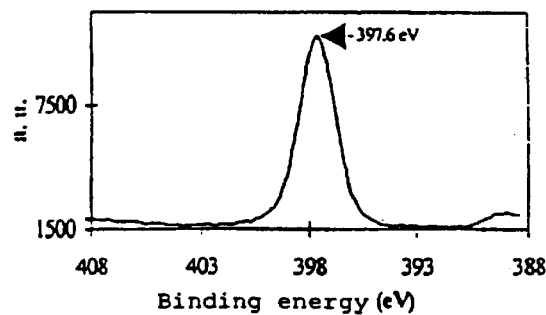

The Si2p and N1s levels of $Si_3N_4$ are represented respectively in FIGS. 2A and 2B. The very narrow Si2p peak indicates a single silicon state corresponding to the silicon of the nitride at 101.9 eV. A small amount of oxygen is observed, the 1s level of which appears at 532.4 eV. The $[O_s]/[Si_s]$ ratio is 0.2. The $[N_s]/[Si_s]$ ratio is close to 1. The $([O_s])/[Si_s]$ overall stochiometry is 1.2 and therefore very close to the theoretical stochiometry of 1.33. In the case of silicon nitride, the stochiometry of the surface is generally considered to be identical to that throughout the body [8]. The oxygen detected by XPS therefore belongs to the structure of the α phase of the silicon nitride and there is no $SiO_2$.

EXAMPLE 3

PREPARATION AND CHARACTERIZATION OF A CATALYST OF THE INVENTION

1) Preparation of the Catalysts

The catalysts were prepared according to the technique which uses palladium acetylacetonate $Pd(C_5H_7O_2)_2$ as precursor.

The silicon nitride support is impregnated with metal salts in a first stage. Following the impregnation stage, a heat treatment is necessary, on the one hand to remove the ligand and, on the other hand, to obtain the reduced metal. To this end, three heat treatments were used, the conditions of which were set by the literature and by a study carried out in the laboratory on the decomposition of palladium acetylacetonate [9].

These treatments are:
a calcination at 350° C. under a flow of oxygen, followed by a reduction stage,
heating at 400° C. under a flow of argon,
a direct reduction at 400° C. under hydrogen.

1.1) Impregnation

The following stages are carried out for the impregnation of the silicon nitride:
the palladium acetylacetonate complex is dissolved under warm conditions in toluene at approximately 80° C.; this stage takes approximately 1 hour;
the silicon nitride is subsequently brought into contact with this solution and the combined mixture is kept stirred at room temperature; during this stage, which is carried out under a hood, the toluene evaporates very slowly and the acetylacetonate complex recrystallizes at the surface of the silicon nitride; the complete evaporation under a hood of 100 ml of toluene necessary for the dissolution of 1 g of acetylacetonate lasts approximately 20 hours;
the solid is subsequently dried at 80° C. under low vacuum for 15 hours.

Two preparations involving different amounts of palladium were carried out. The percentage of palladium for these impregnations is presented in the following Table 1.

TABLE 1

|  | Mass of $Pd(C_5H_7O_2)_2$ used for the preparation | Theoretical % by mass of Pd per 5 g of $Si_3N_4$ | % by mass of Pd effectively attached (chemical analysis) |
|---|---|---|---|
| Preparation 1 on $Si_3N_4$ | 0.2 g | 1.5% | 1.43% |
| Preparation 2 on $Si_3N_4$ | 0.15 g | 0.75% | — |

1.2) Activation Heat Treatment

The support impregnated with the precursors has to be subjected to an activation heat treatment necessary to remove the ligand and to produce the reduced metal. This stage is the most important because it conditions the growth of the palladium particles on the surface of the support and consequently defines the final characteristics of the catalyst.

The most commonly recommended heat treatment for the removal of the ligand consists of a calcination under oxygen. Preceding studies carried out in the laboratory by thermogravimetric analysis [9] have shown that all the ligands were decomposed in oxygen at 350° C. Following this treatment, it is necessary to carry out a reduction in order for the palladium to be active. The palladium is already reducible at room temperature. However, a temperature of 300° C. was chosen in order to avoid any ambiguity with regard to the final state of the palladium (cf. FIG. 2A).

Argon also makes it possible to simultaneously carry out the decomposition stage and the reduction stage. The reduction of the metal under this condition is explained by the presence of numerous hydrogen atoms in the $Pd(C_5H_7O_2)_2$ molecule, which, during the decomposition, recombine and thus create a highly reducing medium in the surroundings of the metal (cf. FIG. 2B).

Under argon, palladium acetylacetonate decomposes between 100° C. and 200° C. [9]. However, a higher temperature (400° C.) has been chosen in order to bring to completion the decomposition and the reduction of the catalytic precursor.

Procedure:

Approximately 1 g of sample is placed in a 3-armed quartz cell represented in FIG. 1, where the reference (1) indicates the inlet arm for the gases, the reference (2) indicates the outlet arm for the gases or vacuum arm and the reference (3) indicates the arm for introducing the sample. The gas flow rate is 2 cm³/s, creating a fluidized bed from the bottom upward. The various gases used are dried beforehand over zeolite. The cell, while being swept, is positioned in a thermostatically controlled oven with a programmable rise in temperature.

The various temperature programs used are represented diagrammatically in FIG. 2, in which FIG. 2A corresponds to the calcination-reduction treatment and FIG. 2B to the decomposition under argon.

2.2) Characterization of the $Pd/Si_3N_4$ Catalysts

Particle Size Characterization

The material exhibiting the lower percentage of palladium (0.75% of palladium) was observed using microscopy.

The calcination-reduction treatment results in a wide distribution in size of the palladium particles. However, a high proportion of the particles have a diameter of less than 4 nm. The largest size observed for this catalyst reaches approximately 20 nm.

After decomposition under argon, the palladium is much more homogeneous in size. The range is between 1 and 7 nm and the mean size remains in the vicinity of that obtained after calcination and reduction.

Characterization by Hydrogen Thermal Desorption

The hydrogen thermal desorption results are presented in Table 2 hereinbelow for the materials originating from the two impregnations which have been subjected to the various activation heat treatments. The mean diameter of the particles, observed by microscopy, and the corresponding theoretical dispersion are also reported.

TABLE 2

| Heat treatment | % Pd | $N_H/N_{pd}$ [sic] | Dispersion D |
|---|---|---|---|
| Calcination-reduction | 0.75% | 0.32 (3.5 nm) | 0.24 |
|  | 1.43% | 0.17 (6.7 nm) | — |

TABLE 2-continued

| Heat treatment | % Pd | $N_H/N_{pd}$ [sic] | Dispersion D |
|---|---|---|---|
| Decomposition under argon | 0.75% | 0.09 | 0.28 |
| | 1.43% | 0.09 | — |

(*) mean diameter deduced from the hydrogen thermal desorption result, $d_s = 1.13/(N_H/N_{pd})$ The activation treatment under argon probably results in contamination of the palladium by carbon originating from the acetylacetonate ligand, which might explain the low measured values of the $N_H/N_{Pd}$ ratio.

After calcination-reduction, the catalysts exhibit a greater ability to chemisorb hydrogen. In the case of the material with a low percentage of palladium, the $N_H/N_{Pd}$ ratio is greater than the theoretical dispersion of the catalyst determined by microscopy. Nevertheless, it may be considered that the $N_H/N_{Pd}$ ratio is representative of the dispersion of the catalyst.

On the assumption of spherical particles, the calcined-reduced catalyst with 1.43% of palladium would have, according to the thermal desorption result, a mean size of the metal particles of 6.7 nm resulting from the equation $$d_s = \frac{1.13}{N_H/N_{Pd}}$$

Structural Characterization by X-ray Diffraction

As a result of the high density of diffraction lines due to the structure of the silicon nitride, it is impossible to characterize the metal phase by X-ray diffraction.

Characterization of the Surface by XPS

The binding energies presented were corrected for the charge effect, induced by the insulating nature of the silicon nitride, by referring to the binding energy of the is electrons of nitrogen in $Si_3N_4$ at 397.6 eV [7].

a) Change in the Surface of the Support (Si2p level) After Calcination-reduction The binding energy of the 2p electrons of the silicon at 101.9 eV after impregnation and calcination-reduction is identical to that of the metal-free silicon nitride. A second state due to silicon oxide is not observed.

Likewise, the decomposition under argon does not result in modifications of the surface of the silicon nitride.

b) Physicochemical State of the Palladium Deposited on Silicon Nitride

It is found that the ratio of the concentrations $[Pd_s]/[Si_s]$ deduced from the photo-emission (XPS) measurements is in the vicinity of 0.05 for both methods of activation of the catalysts and, furthermore, that it does not change very much when the percentage by mass of palladium is increased from 0.75 to 1.43%. The signal of the silicon may be regarded as remaining constant, it being known that the degree of coverage with palladium is low in all the cases (there is the equivalent of 0.4 monolayer in the case of the catalyst with 0.75% of palladium and 0.7 monolayer for that with 1.43%).

Under these conditions, it may be concluded that the morphology of the palladium particles very probably has a two-dimensional aspect for the low palladium content and that only the height of the particles increases with the percentage of metal deposited.

TABLE 3

Binding energies of the 3d5/2 [sic] electrons of palladium determined by XPS

| Heat treatment | % Pd | Binding energy ($3d_{5/2}$ electrons) |
|---|---|---|
| Calcination-reduction | 0.75% | 336.1 eV |
| | 1.43% | 335.7 eV |
| Decomposition under argon | 0.75% | 335.6 eV |
| | 1.43% | 335.2 eV |

Table 3 exhibits the binding energies of palladium in the various catalysts studied. With the exception of the catalyst with a high percentage of palladium decomposed under argon, the binding energies of the 3 d5/2 electrons of palladium are greater than those usually reported in the literature for palladium metal, i.e. 335.2 eV or 335.3 eV.

As the catalysts are stored in the open air, it was confirmed, to begin with, on the catalyst exhibiting the highest binding energy (calcined-reduced catalyst with 0.75% of palladium) whether the palladium is indeed reduced.

For this, a second analysis was carried out after a reduction at 400° C. and without exposing to the air. This operation was carried out by means of a transfer case which makes it possible to connect the reduction oven to the XPS chamber. The binding energy of the 3 d5/2 electrons of 336 eV was virtually unaltered by this treatment, indicating that the palladium was not oxidized.

This not insignificant difference might then be explained by a size effect. This is because it has already been observed that small particles have higher binding energies than large particles.

In the case of the present catalysts, the mean diameter of which is greater than 3 nm, it would seem that the increase in the binding energy is not entirely due to a size effect.

This charge effect can then be explained by electronic phenomena of interactions between the metal and the silicon nitride. This is because it can be supposed that if there is shifting of electrons from the palladium-silicon nitride interface toward the silicon nitride, positive charges will be created on the metal particle. On the assumption that these charges are delocalized on the surface of the particle, this would result in an increase in the binding energy measured by XPS.

Another phenomenon for explaining the shift might be a mechanical effect of interaction between the silicon nitride and the palladium which would result in a structural modification of the latter, which might lead to modifications in its electronic properties.

c) Relative Concentration of Carbon at the Surface

The binding energies of the C1s electrons and the relative concentrations of carbon at the surface of the various catalysts are presented in Table 4 hereinbelow.

TABLE 4

Binding energies of the 1s electrons of carbon and ratio of the concentrations $[C_s]/[Si_s]$ which is detected by XPS

| Heat treatment | % Pd | Binding energy (1s electrons) | $[C_s]/[Si_s]$ |
|---|---|---|---|
| Calcination-reduction | 0.75% | 284.7 eV | 0.083 |
| | 1.43% | 284.7 eV | 0.087 |
| Decomposition under argon | 0.75% | 284.6 eV | 0.14 |
| | 1.43% | 284.7 eV | 0.37 |

The two materials decomposed under argon have a higher level of carbon than those calcined-reduced. This result confirms the fact that the activation of the catalysts under argon leaves a carbonaceous deposit at the surface. The amount of carbon depends on the amount of palladium acetylacetonate involved in the preparation. This carbonaceous deposit results in a decrease in the number of active sites at the surface of the catalyst as observed by virtue of the hydrogen thermal desorption.

EXAMPLE 4

REACTIVITY OF THE Pd/Si$_3$N$_4$ CATALYSTS AND COMPARISON WITH A Pd/α-Al$_2$O$_3$ CATALYST

It was first confirmed that there is very little difference in activity according to whether the Pd/Si$_3$N$_4$ catalysts activated under argon or by calcination-reduction are used.

Subsequently, the activity of the Pd/Si$_3$N$_4$ catalyst was compared with that of a more conventional Pd/α-Al$_2$O$_3$ catalyst resulting from different reaction conditions.

The differences in behavior will be discussed hereinbelow in connection with the change in the physicochemical properties of the two solids.

1) Pretreatment Conditions for the Catalysts

The activity is measured for three initial states of the catalysts:

State 1: starting catalyst, reduced at 500° C. under hydrogen,

State 2: catalyst reduced at 500° C. and treated at 600° C. for 1 hour in the presence of the reaction mixture (1% methane and 4% oxygen in nitrogen), State 3: catalyst reduced and treated at 800° C. for 3 hours in the presence of the abovedefined reaction mixture.

All the temperature rises are carried out linearly at the rate of 1° C./min. After each treatment, the solids are purged under nitrogen for 30 minutes at the treatment temperature.

All the conditions of the catalytic test (flow rates and partial pressures) are defined in Example 1, 5).

2) Activity of the Pd/Si$_3$N$_4$ Catalysts in State 1 and State 2: Influence of the Preparation Method The catalytic activity is measured as a function of the temperature in state 1 and state 2 on the solids exhibiting 0.75% of palladium.

Figure 5A:
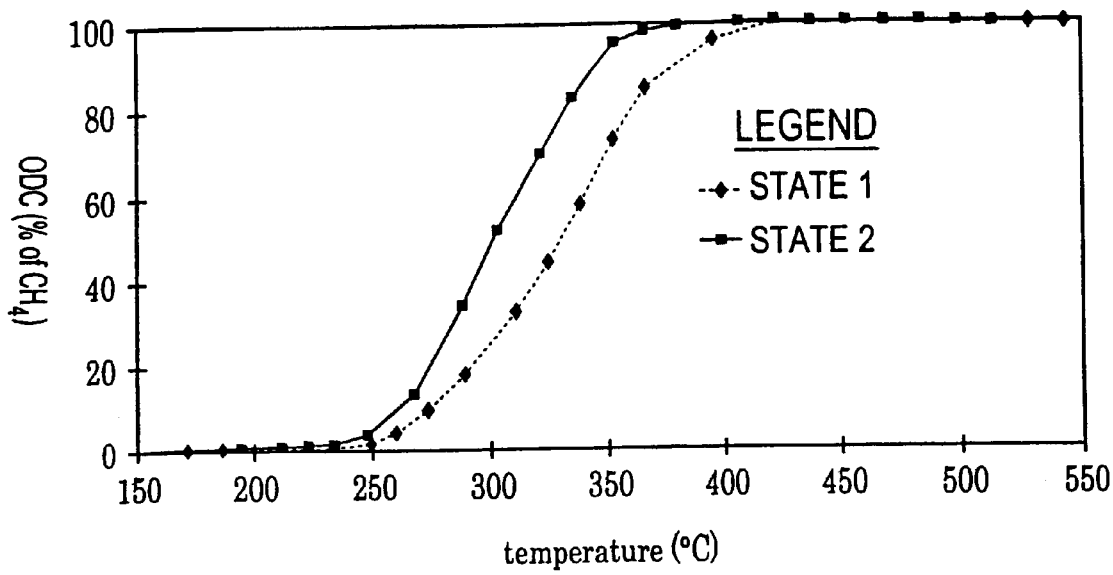
FIG. 5 exhibits the curves for conversion of methane as a function of the temperature in state 1 or state 2 of the Pd/$Si_3N_4$ catalyst, according to whether the catalyst has been activated under argon (FIG. 5A) or by calcination-reduction (FIG. 5B); the states 1 and 2 are defined in Example 4.
Figure 5B:
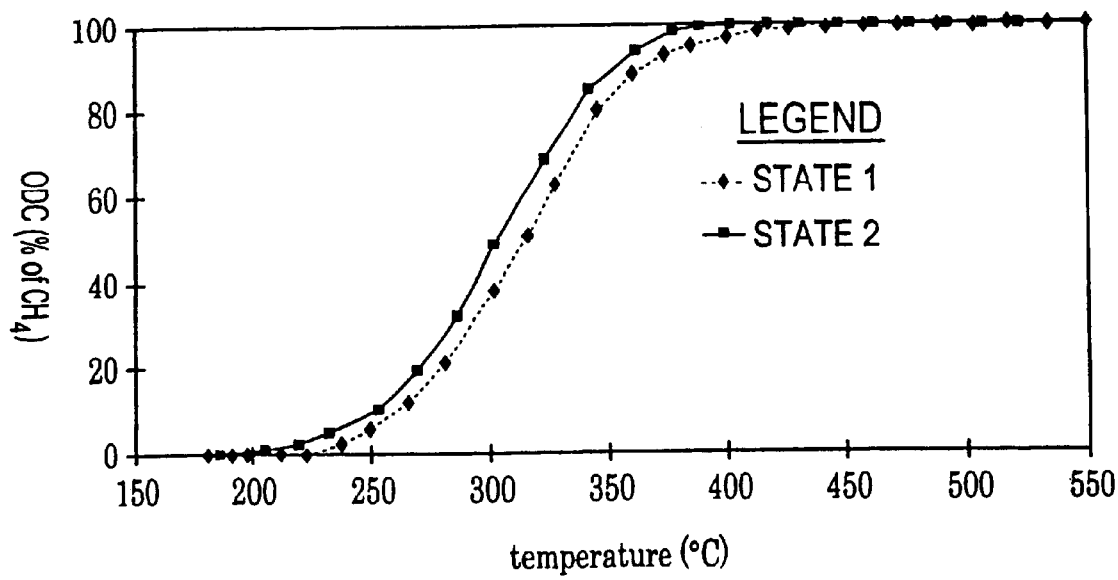

The conversion as a function of the temperature of the catalyst activated under argon (FIG. 5A) and of the calcined-reduced catalyst (FIG. 5B) is presented in FIG. 5.

In both cases and for both states of the solids, no emission of carbon monoxide was observed in the measurement region.

The conversion of methane is substantially greater in state 1 for the calcined-reduced catalyst. In fact, it exhibits a half-conversion temperature of 314° C., whereas the catalyst activated under argon reaches half-conversion at 329° C.

In state 2, the two catalysts are more active with respect to the state 1 and their half-conversion temperature, of the order of 300° C., is identical.

There therefore exists very little difference in behavior according to whether a calcined-reduced catalyst or a catalyst activated under argon is used. The lower activity in state 1 observed on the solid where the acetylacetonate has been decomposed under argon is explained by the presence of carbonaceous residues on the palladium. These residues are removed during reaction in an oxidizing atmosphere to encounter, in state 2, an activity identical to that of the calcined-reduced catalyst.

Due to the small differences observed, one or other of the catalysts will be used without distinction in the comparison study with the catalyst with palladium deposited on alumina.

3) Study of the Reactivity of a Pd/Si$_3$N$_4$ Catalyst Compared with that of a Pd/α-Al$_2$O$_3$ An alumina (catalyst support widely used in the field of combustion) in the a allotropic form, which is the most stable form, was chosen in order to be freed from problems of phase transitions which can take place at temperatures of the order of the reaction temperatures. Furthermore, this material makes it possible to have the same specific surface conditions as those of the silicon nitride. The alumina used is a Rhône-Poulenc product with a specific surface of 10.5 m$^2$/g.

Preparation and Characteristics of the Pd/α-Al$_2$O$_3$ Catalyst The Pd/α-Al$_2$O$_3$ catalyst was prepared under the same conditions as the catalysts tested, namely by impregnation with palladium acetylacetonate, and the activation was carried out by a conventional calcination-reduction treatment as described in Example 3.

The combined characteristics of the catalyst are summarized in Table 5 where, by way of comparison, the characteristics of the calcined-reduced Pd(0.75%)/Si$_3$N$_4$ catalyst are also reported.

TABLE 5

Characteristics of the Pd/α-Al$_2$O$_3$ and Pd/Si$_3$N$_4$ catalysts

| | Percentage of palladium | Dispersion (hydrogen thermal desorption) | XPS: binding energy of the Pd 3d$_{5/2}$ electrons |
|---|---|---|---|
| Pd/α-Al$_2$O$_3$ catalyst | 1.05% | 0.41% → ds[sic] = 2.8 nm | 335.1 eV –> zerovalent Pd |
| Pd/Si$_3$N$_4$ catalyst | 0.75% | 0.32 → ds[sic] = 3.5 nm | 336.1 eV |

The Pd/α-Al$_2$O$_3$ catalyst exhibits a substantially greater dispersion than Pd/Si$_3$N$_4$. The energy of the 3 d5/2 electrons of the palladium, measured by XPS, is characteristic of palladium in the zerovalent state. In the case of the Pd/Si$_3$N$_4$ catalyst, the electronic properties of the palladium are probably modified by effects of interaction with the support.

Reactivity of the Catalysts in State 1 and State 2

Figure 6A:
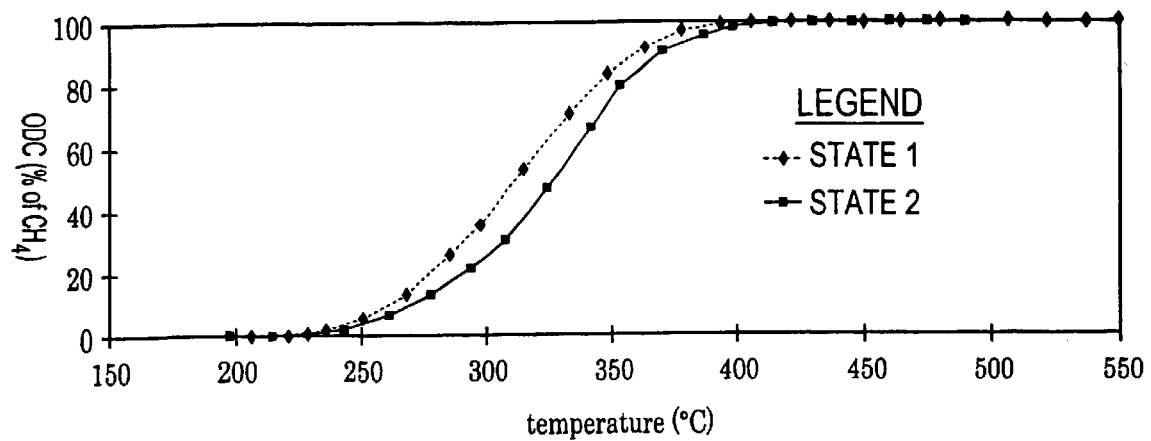
FIG. 6 exhibits the curves for the conversion of methane as a function of the temperature for the catalysts Pd(1.05%)/α-$Al_2O_3$ (FIG. 6A) and Pd(0.75%)/$Si_3N_4$ (FIG. 6B) in state 1 or state 2, which are defined in Example 4.
Figure 6B:
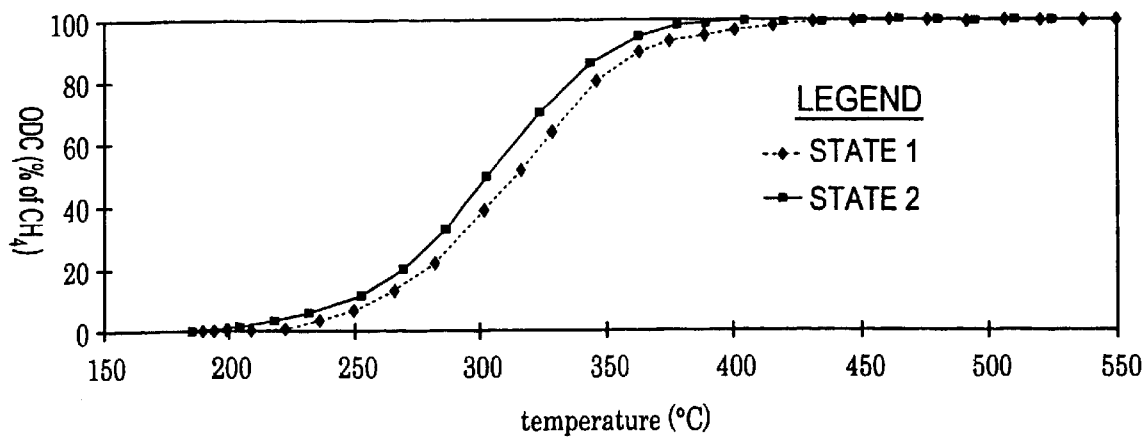

The conversion of methane as a function of the temperature for the Pd/α-Al$_2$O$_3$ and Pd/Si$_3$N$_4$ catalysts in state 1 and state 2 is presented in FIG. 6.

The two catalysts behave differently. In fact, the catalyst supported on silicon nitride is more active when it is in state 2, whereas the Pd/α-Al$_2$O$_3$ solid exhibits deactivation after a treatment under the reaction mixture up to 600° C.

The half-conversion temperatures for Pd/α-Al$_2$O$_3$ are 310° C. and 325° C. in state 1 and state 2 respectively. Those for Pd/Si$_3$N$_4$ are 314° C. and 300° C.

Reactivity of the Catalysts in State 3

Figure 7A:
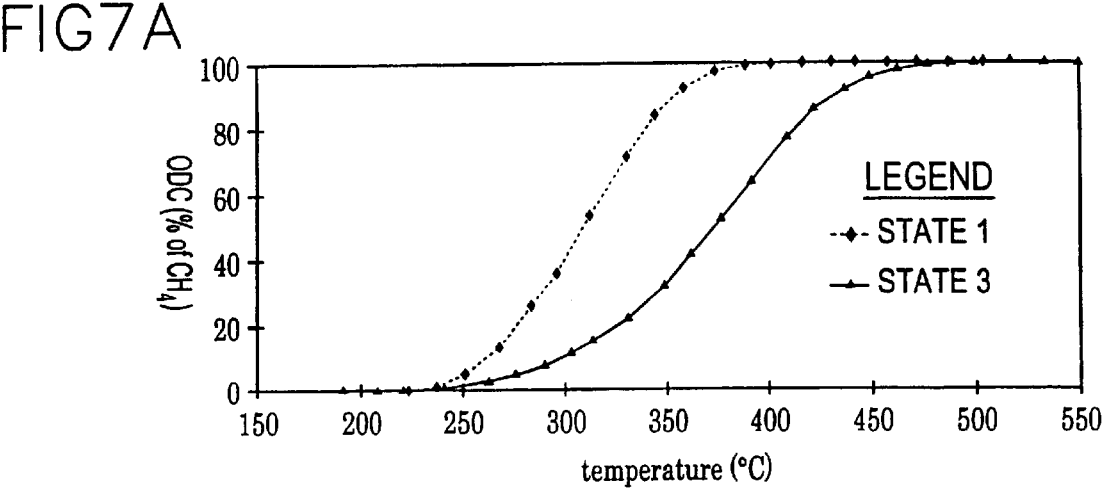
FIG. 7 exhibits the curves for the conversion of methane as a function of the temperature for catalysts Pd(1.05%)/α-$Al_2O_3$ (FIG. 7A) and Pd(0.75%)/$Si_3N_4$ (FIG. 7B) in state 1 or in state 3, which are defined in Example 4.
Figure 7B:
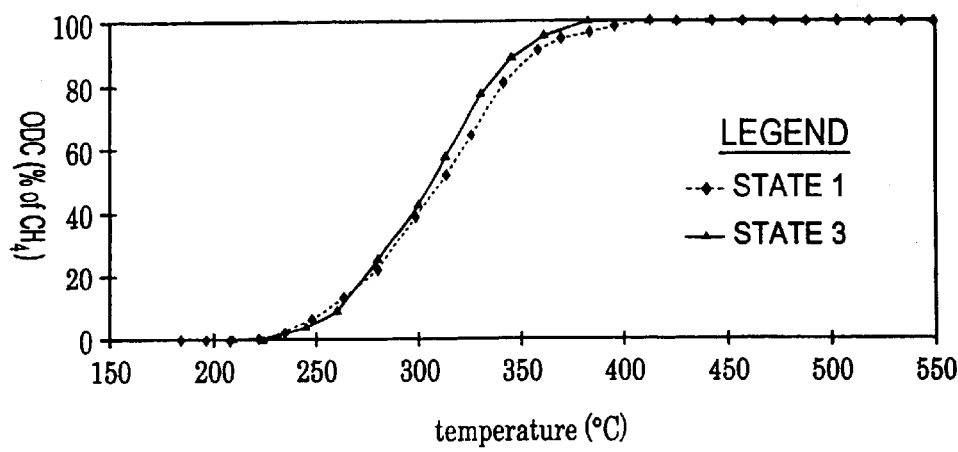

The conversion of methane as a function of the temperature for the catalysts in state 1 and state 3 is presented in FIG. 7.

Examination of these curves shows that the Pd/α-Al$_2$O$_3$ solid becomes much less active after a heat treatment at 800° C. under the reaction mixture, whereas the Pd/Si$_3$N$_4$ catalyst is activated when it is in state 3. It retains approximately the same activity as when it is in state 2.

The Pd/α-Al$_2$O$_3$ and Pd/Si$_3$N$_4$ catalysts have respective half-conversion temperatures in state 3 of 375° C. and 307° C.

Activity Per Surface Metal Atom in the 3 States

The dispersion of the active phase, determined by hydrogen thermal desorption, was used to calculate the activity per surface metal atom.

For the activity of the catalysts in state 2 and state 3, the calculation was carried out from the dispersion measured after the various reactivity tests.

The dispersion values for the fresh and aged catalysts are presented in Table 6. Examination of this table shows that the loss in metal surface is virtually identical for the two solids.

TABLE 6

Dispersions of the catalysts in the various states

| Catalyst | State 1 | State 2 | State 3 |
|---|---|---|---|
| Pd/α-Al$_2$O$_3$ | 0.41 | 0.25 | 0.1 |
| Pd/Si$_3$N$_4$ | 0.32 | 0.25 | 0.12 |

The activity per surface site as a function of the temperature, determined as a function of the temperature of the two solids for the three states, shows that the surface metal atoms of the catalyst supported on silicon nitride are more active than those of the Pd/α-Al$_2$O$_3$ solid, whatever the state.

The activities at 250° C. of the two solids for each state are reported in Table 7. It is found that the catalyst supported on alumina exhibits substantially the same activity in state 1, state 2 and state 3. The decrease in the amount of methane converted in state 2 and state 3 with respect to the fresh solid is explained simply by the loss in metal surface by sintering.

The surface palladium atoms of the catalyst which is supported on silicon nitride become increasingly active as the aging tests proceed, despite a sintering of the palladium. The effect is very marked when the solid changes from the state 1 to the state 2.

TABLE 7

Activities of the catalysts at 250° C.

| State 1 | State 2 | State 3 |
|---|---|---|
| Pd(1.05%)/α-Al$_2$O$_3$ (TOF at 250° C.) | | |
| 11 h$^{-1}$ | 12 h$^{-1}$ | 16.5 h$^{-1}$ |
| Pd(0.75%)/Si$_3$N$_4$ (TOF at 250° C.) | | |
| 24 h$^{-1}$ | 40 h$^{-1}$ | 46 h$^{-1}$ |

Summary of the Reactivity Results

In the temperature range in which the activity is measured, the two catalysts are 100% selective for carbon dioxide, whatever the initial treatment which is applied to them.

The temperatures for half-conversion of the methane for each of the catalysts in all the states are presented in Table 8.

In state 1, the half-conversion temperature is virtually the same according to whether one or other of the solids is used.

After the initial treatments under the reaction mixture, the Pd/α-Al$_2$O$_3$ solid is less able than the Pd/Si$_3$N$_4$ to carry out the oxidation reaction of methane. The loss in metal surface measured by hydrogen thermal desorption, which is substantially identical for the two solids, shows that the sites at the surface of the Pd/Si$_3$N$_4$ are the most active.

There therefore exists a fairly large support effect on the activity of the palladium with respect to the oxidation of methane.

TABLE 8

Temperatures for the half-conversion of methane for the catalysts in the various states

| | Half-conversion temperatures | | |
|---|---|---|---|
| | STATE 1 | STATE 2 | STATE 3 |
| Pd(1.05%)/α-Al$_2$O$_3$ | 310° C. | 325° C. | 375° C. |
| Pd(0.75%)/Si$_3$N$_4$ | 314° C. | 300° C. | 307° C. |

Characterization of the Catalysts After Reaction

In order to attempt to understand the differences in activity observed, the two Pd/α-Al$_2$O$_3$ and Pd/Si$_3$N$_4$ catalysts are characterized after the reactivity tests in state 2 and in state 3. The differences in sintering behavior, the changes in the electronic state of the palladium and the oxidation behavior of the surface of the silicon nitride are observed in particular.

Sintering Behavior

The following observations are made by microscopy:

in state 1, the distributions are centered over the 3–4 nm range for the fresh catalysts;

in state 2, the two catalysts have virtually the same size histograms; the two solids therefore sinter in the same way up to 600° C. under the reaction mixture; the distributions centered over the 3–4 nm range for the catalysts in state 1 are shifted over the 4–5 nm range; and due to the high heterogeneity in the sizes of particles observed in state 3, the distributions could not be carried out with the same accuracy as in state 1 and state 2; the Pd/Si$_3$N$_4$ solid seems to exhibit better sintering behavior; the sizes are predominately less than 10 nm; no particle with a diameter of greater than 30 nm was observed.

The size distribution for the palladium supported on alumina extends beyond 30 nm and the maximum diameter observed is of the order of 50 nm.

The sintering is virtually identical up to 600° C. for the two catalysts. After aging up to 800° C., the palladium supported on silicon nitride exhibits better resistance to sintering. This is because, in contrast to the Pd/α-Al$_2$O$_3$ solid, particles having a diameter of greater than 30 nm are not observed.

Characterization by Photoelectron Spectroscopy

Oxidation Behavior of the Silicon Nitride

Figure 8:
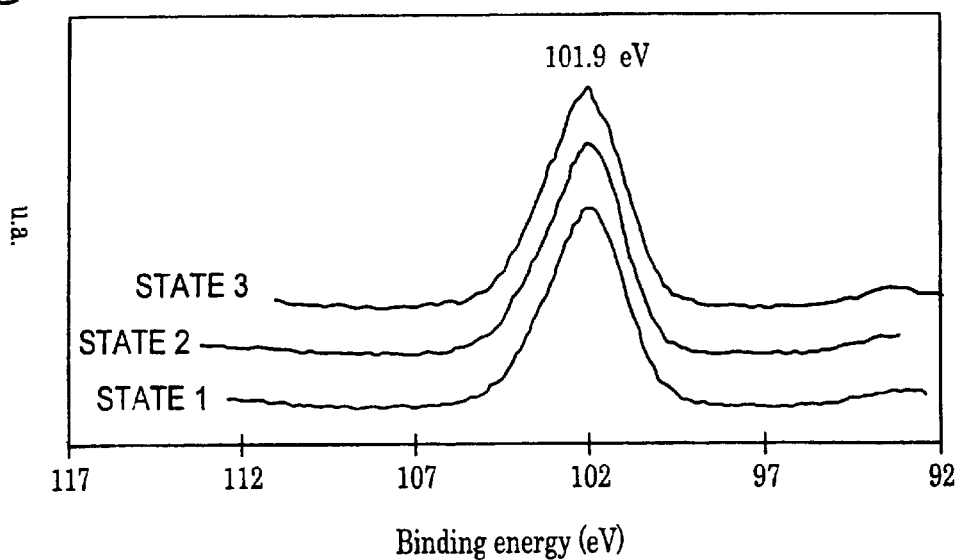
FIG. 8 exhibits the energy spectra for the 2p electrons of silicon for the catalyst Pd(0.75%)/$Si_3N_4$ which has been subjected to various treatments defined in Example 4.

The energy spectra of the 2p electrons of the silicon for the catalysts which have been subjected to the various aging treatments are presented in FIG. 8. The charge effect has been corrected by taking as reference the energy of the 1s electrons of the nitrogen in Si$_3$N$_4$ at 397.6 eV.

After the aging treatments (states 2 and 3) under the reaction mixture, the energy spectra of the 2p electrons of the silicon are not modified with respect to that of the state 1, indicating that oxidation of the surface of the silicon nitride probably does not take place.

The relative concentrations of nitrogen and of oxygen are combined in Table 9.

A slight increase in the amount of oxygen in state 3, which may be attributable to the appearance of palladium oxide during the treatment, is observed. However, this increase, which takes place at the expense of the concentration of nitrogen, seems to indicate that the surface of the silicon nitride is beginning to oxidize.

TABLE 9

Relative concentrations of oxygen and of nitrogen for the Pd(0.75%)/Si₃N₄ catalyst in the various states

| STATE | $[O_s]/[Si_s]$ | $[N_s]/[Si_s]$ |
|---|---|---|
| State 1 | 0.19 | 0.99 |
| State 2 | 0.24 | 0.98 |
| State 3 | 0.41 | 0.82 |

In contrast to other silicon compounds, silicon nitride is highly resistant to oxidation.

Electronic State of the Palladium

The binding energies of the 3 d5/2 electrons of the palladium and the widths at mid-height of the Pd3d5/2 peaks in the various states of the two catalysts are presented in Table 10. The charge effects are corrected by taking as reference the energy of the 1s electrons of nitrogen at 397.6 eV for the silicon nitride and the 2p electrons of the aluminum at 74 eV for the alumina.

For the Pd/α-Al₂O₃ solid, the binding energy is virtually identical whatever the treatment applied to the catalyst. The palladium therefore remains in the zerovalent state. However, a not insignificant broadening is observed in state 3, which probably reflects the presence of oxidized palladium. In the case of the Pd/Si₃N₄ solid, the binding energy of 336.1 eV on the fresh catalyst decreases after the agings under the reaction mix. The return of the binding energy of the Pd3d5/2 level to a value characterizing zerovalent palladium can be explained by the sintering of the particles. This is because the electronic shift on the fresh catalyst, probably induced by a support effect, would no longer be visible at the surface of larger particles. The peak widths, virtually constant and of the order 2 eV, seem to indicate that there exists a single state of the palladium after the treatments under the reaction mixture.

TABLE 10

Binding energies of the 3d5/2 [sic] electrons of palladium and width at mid-height of the Pd3d5/2 [sic] peaks of the catalysts in the various states

| Catalyst | State 1 | | State 2 | | State 3 | |
|---|---|---|---|---|---|---|
| Pd/α-Al₂O₃ | 335.1 eV | 1.9 eV | 335.2 eV | 1.9 eV | 335.2 eV | 2.5 eV |
| Pd/Si₃N₄ | 336.1 eV | 2 eV | 335.6 eV | 1.8 eV | 335.4 eV | 2.1 eV |

In conclusion, with virtually equivalent initial characteristics, the Pd/Si₃N₄ catalyst is more active than the Pd/α-Al₂O₃ catalyst with respect to the oxidation reaction of methane, whatever the aging treatments applied to the two solids. There therefore exists a very marked support effect.

The silicon nitride has shown, in particular with respect to tests carried out on silicon carbide, excellent properties of resistance to oxidation during the reaction. In fact, even after aging up to 800° C. under the reaction mixture, the oxidation of the surface remains moderate, which prevents deactivation by coating the active phase with silica.

The differences in reactivity between palladium deposited on alumina and on silicon nitride are difficult to explain in the light of the characterizations carried out after reaction. This is because the loss in metal surface by sintering is on the whole identical for the two materials. The sites at the surface of the palladium deposited on silicon nitride are consequently more active than those which are at the surface of the Pd/α-Al₂O₃.

The photoemission measurements show differences between the two catalysts for the electronic properties and for the morphology of the palladium particles. With an identical exposed surface, the relative amount of palladium measured by photoemission is in fact different and seems to indicate a sintering resulting in particles which do not have the same shape on one or other of the supports.

BIBLIOGRAPHY

[1] V. I. Simagina, T. F. Nokhrina, N. N. Kundo, G. D. Nalivka, Otkrytiya, Izobret. Prom. Obraztsy, Tovarnye Znak (1984) 22, 28–29

[2] S. Brunauer, P. H. Emmet and E. Teller, J. Am. Chem. Soc., 60 (1938), 309

[3] Y. Soma Noto and W. M. H. Sachtler, J. Catal., 32 (1974), 315

[4] F. G. Dwyer, Catal. Rev. Sci. Eng., 6 (1972) 261

[5] Handbook of Chemistry, C. R. C. Press, edited by R. C. Weast, 56th Edition, 1975–1976, p. F224–226

[6] M. Boudart and G. Djeda-Mariadassou, Cinétique des réactions en catalyse héterogene [Kinetics of heterogeneous catalysis reactions], published by Masson, (1982) 165

[7] J. A. Taylor, G. M. Lancaster and J. W. Rabelais., J. Electron. Spectrosc. Relat. Phenom., 13 (1972), 755

[8] L. Lozzi, L. Passacantando, P. Picozzi, S. Santucci, G. Tomassi, R. Alfonsetti and A. Borghesi, Surf. Interface. Anal., 22 (1994), 190

[9] K. Le Bas, Doctoral thesis, Lyons (1980)

What is claimed is:

1. A process for acatalytic chemical reaction comprising depositing asolid catalyst on a refractory catalytic support, wherein:

the solid catalyst is comprised of an active metal phase;

the catalytic support is comprised of silicon nitride in α-form; and the reaction is conducted at a temperature of between 200° C. and 800° C.

2. The process according to claim 1, wherein the silicon nitride is substantially non-porous.

3. The process according to claim 1, wherein the support is in a discrete form, having particles of between 0.1 and 1 μm in size.

4. The process according to claim 1, wherein the active metal phase comprises at least one transition metal.

5. The process according to claim 4, wherein the active metal phase is palladium.

6. The process according to claim 1, wherein the catalytic chemical reaction takes place in the presence of oxygen.

7. The process according to claim 6, wherein the catalytic chemical reaction is an oxidation.

8. The process according to claim 7, wherein the oxidation is a combustion of methane.

9. The process according to claim 1, wherein the catalytic support has a specific surface area of between 5 and 20 m²/g.

10. The process according to claim 1, wherein a ratio of a proportion by weight of a metal of the active metal phase to that of the silicon of the support is between 0.5 and 2% by weight.

11. The process according to claim 1, wherein the catalyst is obtained by impregnating the support with metal salts and then activating the support.

12. The process according to claim 10, wherein the metal salts are acetylacetonate salts.

* * * * *